(12) United States Patent
Hattori

(10) Patent No.: US 6,557,685 B2
(45) Date of Patent: May 6, 2003

(54) MULTIPLE LOCKUP CLUTCH AND TORQUE CONVERTER WITH THE SAME CLUTCH INCORPORATED THEREIN

(75) Inventor: Kazumi Hattori, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 09/817,168

(22) Filed: Mar. 27, 2001

(65) Prior Publication Data

US 2001/0023803 A1 Sep. 27, 2001

(30) Foreign Application Priority Data

Mar. 27, 2000 (JP) .......................... 2000-086245
Oct. 10, 2000 (JP) .......................... 2000-309070

(51) Int. Cl.$^7$ ............................................. F16D 13/74
(52) U.S. Cl. ................. 192/70.12; 192/113.36
(58) Field of Search ................ 192/3.29, 70.12, 192/70.2, 85 AA, 107 R, 113.34, 113.35, 113.36

(56) References Cited

U.S. PATENT DOCUMENTS

| | | | | |
|---|---|---|---|---|
| 4,260,047 A | * | 4/1981 | Nels | 188/251 A |
| 4,485,908 A | * | 12/1984 | Gatewood | 192/213.22 |
| 5,094,331 A | * | 3/1992 | Fujimoto et al. | 192/107 R |
| 5,682,971 A | * | 11/1997 | Takakura et al. | 192/107 R |
| 6,062,367 A | * | 5/2000 | Hirayanagi et al. | 188/264 E |
| 6,247,568 B1 | * | 6/2001 | Takashima et al. | 192/113.36 |
| 6,283,265 B1 | * | 9/2001 | Hirayanagi et al. | 192/113.36 |

FOREIGN PATENT DOCUMENTS

JP          63-198837          12/1988

* cited by examiner

Primary Examiner—Pam Rodriguez
(74) Attorney, Agent, or Firm—Crowell & Moring LLP

(57) ABSTRACT

A multiplate lockup clutch for use in fluid, principally in a torque converter is provided with a multiplicity of friction plates. Each of the friction plates is provided on a friction surface thereof with at least one combined groove, preferably, a plurality of combined grooves. Each combined groove consists of a first groove and a second groove. The first groove extends from an inner circumferential edge to an outer circumferential edge of the friction plate and communicates an inner circumference and an outer circumference of the friction plate with each other. The second groove intersects the first groove and extends in a circumferential direction of the friction plate. As an alternative, a multiplate lockup clutch useful in fluid, primarily in a torque converter is provided with a multiplicity of friction plates, and each of the friction plates is shaped in a waveform as viewed in a circumferential direction thereof.

8 Claims, 5 Drawing Sheets

PRIOR ART

MULTIPLE LOCKUP CLUTCH AND TORQUE CONVERTER WITH THE SAME CLUTCH INCORPORATED THEREIN

BACKGROUND OF THE INVENTION a) Field of the Invention

This invention relates to a multiplate lockup clutch useful primarily as a torque transmitting device in a vehicle and also to a torque converter with the multiplate lockup clutch incorporated therein. More specifically, the present invention is concerned with improvements in or relating to friction plates for multiplate lockup clutches.

b) Description of the Related Art

A multiplate lockup clutch, which performs transmission or non-transmission of torque, is generally arranged in a torque converter which is in turn disposed together with an automatic transmission or the like in a vehicle to transmit torque. An illustrative torque converter with such a multiplate lockup clutch incorporated herein is shown in FIG. 8.

A torque converter 1 is constructed of a multiplate lockup clutch 2, a damper 3, a pump impeller 4, a turbine runner 5, and a stator 6. The stator 6 is supported at axially opposite sides thereof by needle bearings 7 and 8, respectively, and on an inner circumference of the stator 6, an unillustrated one-way clutch is arranged to prevent rotations in a direction reverse to a predetermined direction.

In the multiplate lockup clutch 2, separator plates 24 and a backing plate 25, all of which are spline-fitted on an inner circumference of a clutch case 23, and friction plates 50, which are spline-fitted on an outer circumference of a hub 22, are alternately arranged and are supported by a snap ring 26. On a left side of these plates as viewed in the drawing, a piston 21 is arranged. The multiplate lockup clutch 2 is designed such that, when pressure oil is supplied into a pressure oil compartment 27, the piston 21 is caused to move rightward as viewed in the drawing and hence, the separator plates 24, friction plates 50 and the backing plate 25 are held between the piston 21 and the snap ring 26 to obtain an engaged state.

FIG. 9 is a front view of one of conventional friction plates 50 employed in a multiplate lockup clutch useful in a torque converter of the above-mentioned construction. The friction plate 50 has a construction that a friction lining 51 is secured on a ring-shaped core plate 52 with splines 53 arranged on an inner circumference thereof. On the friction lining 51, communicating grooves 54 are formed such that an inner circumferential edge and an outer circumferential edge of the friction plate 50 are communicated with each other through the communicating grooves 54. These communicating grooves 54 are arranged to damp or reduce judder.

Now, referring back to FIG. 8, the pump impeller 4 is normally kept rotating because it is directly connected to an engine (not shown) via a connecting part 10. A certain level of hydraulic pressure, therefore, normally exists so that, even while the piston 21 of the multiplate lockup clutch 2 is out of operation, a slight pressure is exerted from a right side of the drawing (in a direction of arrows in FIG. 8), in other words, from a side of the backing plate 25. Under this pressure, the backing plate 25, the friction plates 50 and the separator plates 24 are pressed against the piston 21 and hence, are brought into engagement, whereby drag torque is produced. Further, the communicating grooves 54 which are arranged to damp judder show high oil discharge performance, and tend to delicately respond to the above-mentioned pressure and to increase the drag torque further.

SUMMARY OF THE INVENTION

An object of the present invention is, therefore, to provide a multiplate lockup clutch reduced in the above-mentioned drag torque which is produced by an internal pressure of a torque converter. Another object of the present invention is to provide a torque converter with the multiplate lockup clutch incorporated therein.

In a first aspect of the present invention, there is thus provided a multiplate lockup clutch for use in fluid, said multiplate lockup clutch being provided with a multiplicity of friction plates, wherein each of the friction plates is provided on a friction surface thereof with at least one combined groove; and the combined groove consists of a first groove, which extends from an inner circumferential edge to an outer circumferential edge of the friction plate and communicates an inner circumference and an outer circumference of the friction plate with each other, and a second groove which intersects the first groove and extends in a circumferential direction of the friction plate. The multiplate lockup clutch has an advantageous effect in that formation of an oil on each friction plate is facilitated to reduce drag torque to be produced by an internal pressure of a torque converter. Each of the friction plates may preferably be provided with a plurality of such combined grooves. These combined grooves may preferably be repetitively formed at predetermined intervals in the circumferential direction of the friction plate.

In a second aspect of the present invention, there is also provided a multiplate lockup clutch useful in fluid, said multiplate lockup clutch being provided with a multiplicity of friction plates, wherein each of the friction plates is shaped in a waveform as viewed in a circumferential direction thereof. Formation of an oil on each friction plate is facilitated and, when the multiplate lockup clutch is brought into engagement under an internal pressure of a torque converter, each friction plate is brought only at crest portions thereof into engagement with its associated separator plate, leading to a reduction in the contact area between the friction plate and its associated separator plate. The multiplate lockup clutch, therefore, has an advantageous effect that the drag torque to be produced by the internal pressure is reduced further. The waveform may preferably be formed such that crest portions and trough portions are alternately arranged in the circumferential direction of the friction plate.

In third and fourth aspects of the present invention, there are also provided torque converters with multiplate lockup clutches incorporated therein, respectively. These multiplate lockup clutches are the same as those described above as the first and second aspects of the present invention, respectively. These torque converters can show the advantageous effects of the corresponding multiplate lockup clutches.

DETAILED DESCRIPTION OF THE INVENTION AND PREFERRED EMBODIMENTS

Figure 8:
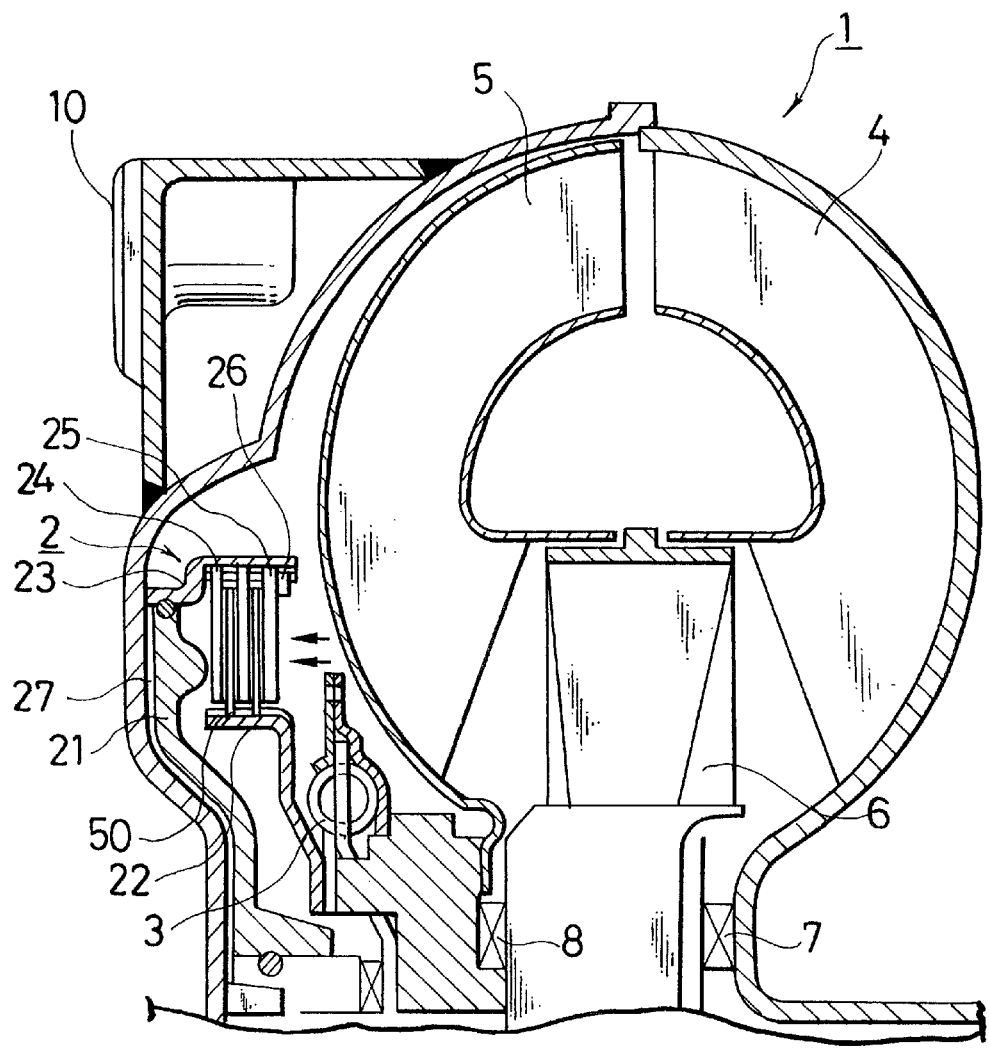
FIG. 8 is a fragmentary axial cross-sectional view of a torque converter with a multiplate lockup clutch to which the present invention can be applied.
Figure 9:
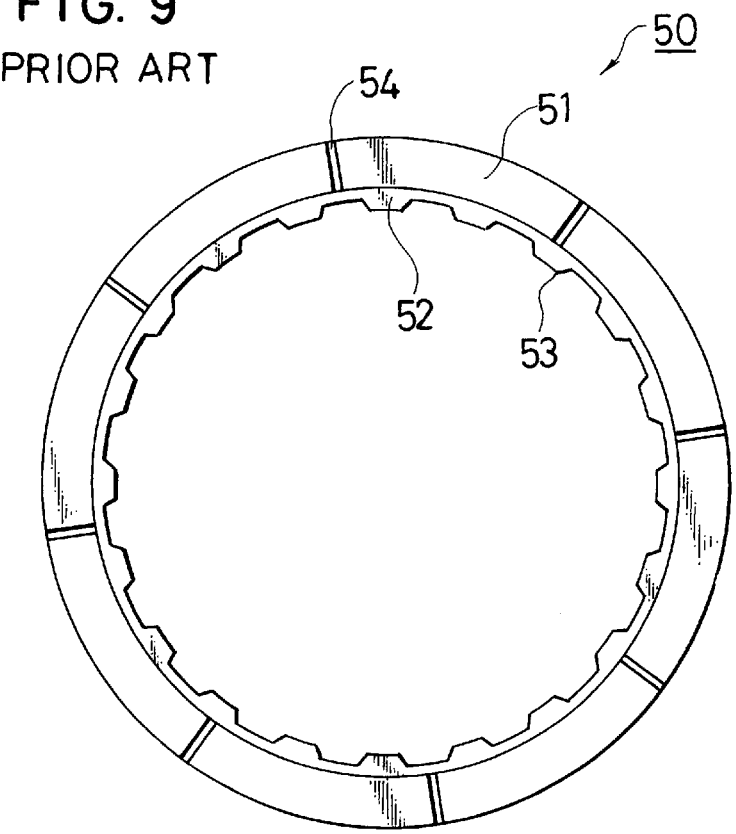
FIG. 9 is a front view of a friction plate in a conventional multiplate lockup clutch.

The multiplate lockup clutches and torque converters according to the present invention are constructed like the conventional multiplate lockup clutch and torque converter shown in FIG. 8.

The present invention makes it possible to achieve a reduction in drag torque by forming oil films between the friction plates and their counterparts, i.e., separator plates and a backing plate, respectively. The second groove or grooves, which extend in the circumferential direction, and the waveform of the friction plate serve to form such oil films. Therefore, no particular limitation is imposed on the depth of the second groove or grooves insofar as such oil films can be formed, and the second groove or grooves may be extremely shallow. In each combined groove, the first groove and the second groove may be different from each other in depth.

According to the present invention, each of plural friction plates in a multiplate lockup clutch is provided on a friction surface thereof with at least one combined groove, preferably, a plurality of combined grooves. The combined groove or each of the combined grooves consists of a first groove and a second groove. The first groove communicates an inner circumference and an outer circumference of the friction plate with each other, while the second groove extends from the first groove in a circumferential direction of the friction plate and is closed at circumferentially opposite ends thereof. As an alternative, each of the friction plates is shaped in its entirety in a waveform as viewed in a circumferential direction thereof.

To bring about an additional advantageous effect, the single combined groove or the plural combined grooves can be formed by frictional lining segments.

The respective embodiments and modifications of the present invention will hereinafter be described in detail with reference to the accompanying drawings, in which like elements of structure will be identified by like reference numerals.

Friction plates in each of the embodiments and modifications can be used as friction plates in the conventional multiplate lockup clutch of the torque converter illustrated in FIG. 8.

(First Embodiment)

Figure 1:
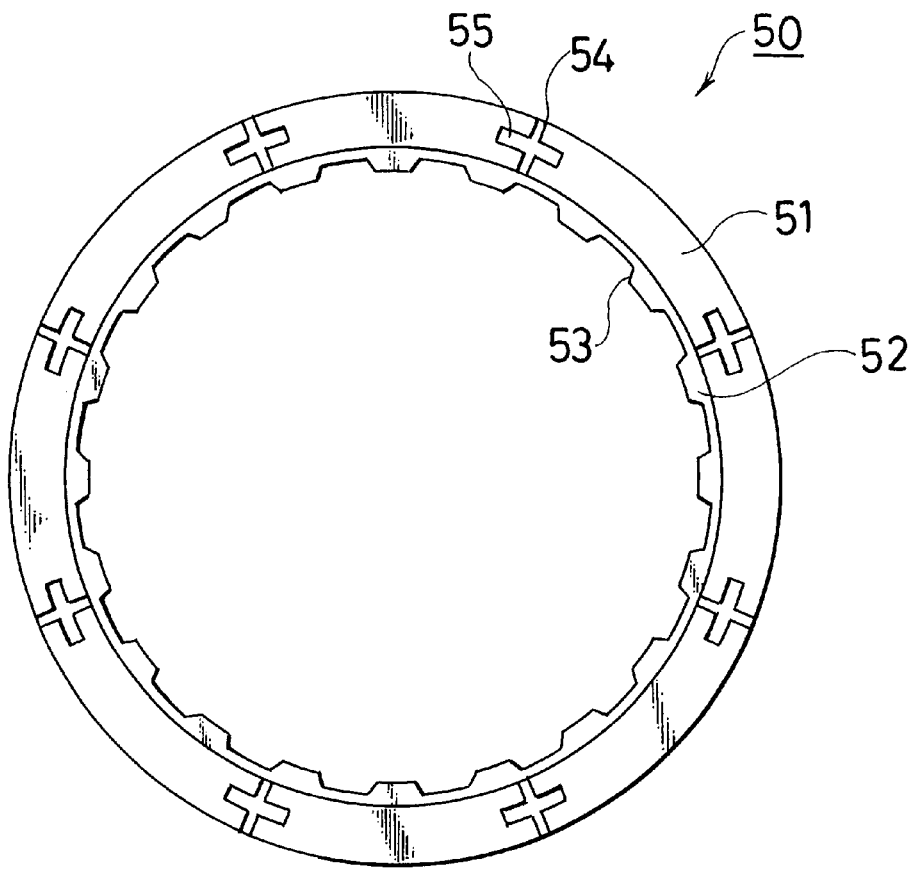
FIG. 1 is a front view of a friction plate in a multiplate lockup clutch according to a first embodiment of the present invention.

With reference to FIG. 1, the multiplate lockup clutch according to the first embodiment of the present invention will now be described. Each friction plate 50 is formed of a ring-shaped core plate 52, which is provided on and along an inner circumference thereof with splines 53, and a friction lining 51 secured on the ring-shaped core plate 52. The friction plate 50 is kept in engagement with the hub (FIG. 8) via the splines 53.

The friction lining 51 is provided with first grooves, that is, communicating grooves 54. These communicating grooves 54 continuously extend between an outer circumferential edge and an inner circumferential edge of the corresponding friction plate 50 and accordingly, communicate an outer circumference and an inner circumference of the friction plate 50 with each other. Namely, even while the friction plates 50 are kept in engagement with the adjacent separator plates and backing plate, respectively, fluid (ATF or the like) inside the torque converter is allowed to flow through the communicating grooves 54 from the side of the inner circumferences of the friction plates 50 to the side of the outer circumferences of the friction plates 50.

The friction lining 51 is also provided with second grooves, that is, non-communicating grooves 55. These non-communicating grooves 55 are in communication with substantially central parts of their corresponding communicating grooves 54, and extend in a circumferential direction of the friction lining 51. Each non-communicating groove 55 extends over predetermined distances from the corresponding communicating groove 54 as a center in the circumferential direction on opposite sides of the corresponding communicating groove 54, and terminate at positions apart by the predetermined distances from the corresponding communicating groove 54. Accordingly, each non-communicating groove 55 is formed such that the non-communicating groove 55 is in communication with its corresponding communicating groove 54 but is closed at the circumferentially opposite ends thereof. Each first groove 54 and its corresponding second groove 55 make up a combined groove, and the first grooves 54 and their corresponding second grooves 55, in other words, the combined grooves are formed at predetermined intervals as viewed in the circumferential direction of the friction plate 50.

Incidentally, the term "communicating groove" as used herein means a groove which allows the fluid to flow between the inner circumference and the outer circumference of the friction plate 50. On the other hand, the term "non-communicating groove" as used herein means a groove, which does not by itself allow the fluid to flow between the inner circumference and the outer circumference of the friction plate 50 but allows the fluid to flow between the inner circumference and the outer circumference of the friction plate 50 through the corresponding communicating groove. In other words, each non-communicating groove does not by itself communicate the inner circumference and the outer circumference of the friction plate 50 with each other but may be in communication with other parts of the friction plate, for example, as formed in communication with its corresponding communicating groove 54. The communicating grooves 54 and the non-communicating grooves 55 can be formed by embossing or cutting after the friction lining 51 is secured on the core plate 52.

(Modifications of the First Embodiment)

FIGS. 2 to 5 are enlarged fragmentary plan views of the modifications of the first embodiment, and each independently illustrate two combined grooves. In principal construction, these modifications are similar to the above-described first embodiment. The modifications will hence be described using the same reference numerals.

Figure 2:
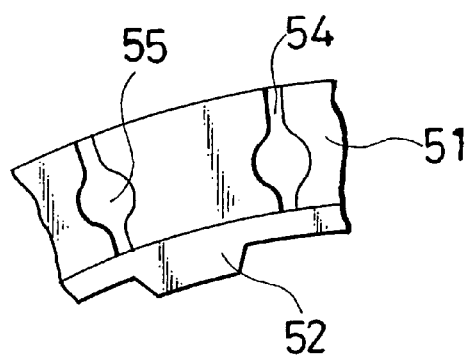
FIG. 2 is an enlarged fragmentary front view of a friction plate in a modification of the first embodiment.

Each non-communicating groove 55 shown in FIG. 2 is in the form of two semicircles closed at their ends distal from the corresponding communicating groove 54 as viewed in the circumferential direction. The non-communicating groove 55 is in communication with the communicating groove 54 and hence, forms a substantially circular groove as a whole. It is, therefore, possible to form an oil film with a good balance between the circumferential direction and the radial direction.

Figure 3:
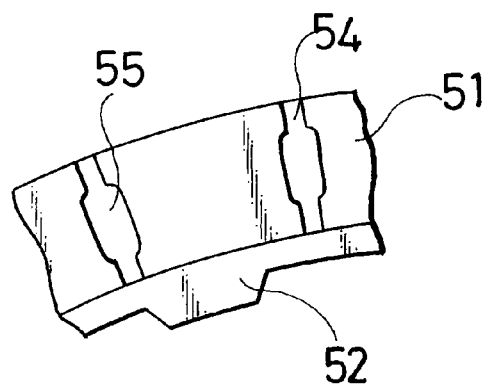
FIG. 3 is an enlarged fragmentary front view of a friction plate in another modification of the first embodiment.

Each non-communicating groove 55 illustrated in FIG. 3 is broad in the radial direction, is short in the circumferential direction, and is closed at circumferentially opposite ends thereof. The non-communicating groove 55 is in communication with its corresponding communicating groove 54 and thus, forms a substantially rectangular groove. It is, therefore, possible to form an oil film with a large width in the radial direction.

Figure 4:
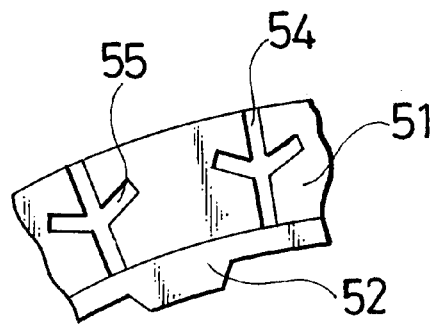
FIG. 4 is an enlarged fragmentary front view of a friction plate in a further modification of the first embodiment.

Each non-communicating groove 55 depicted in FIG. 4 is formed such that the non-communicating groove 55 has an inclination relative to circumferentially opposite sides of its corresponding communicating groove 54, described specifically, extends at opposite end portions thereof toward the outer circumferential edge of the friction plate 50. Owing to this inclination, fluid which is about to move to the external circumference under centrifugal force or the like during rotation of the friction plate 50 can be sufficiently held in the groove, thereby facilitating formation of an oil film. In this modification, each non-communicating groove 55 is also closed at opposite ends thereof.

Figure 5:
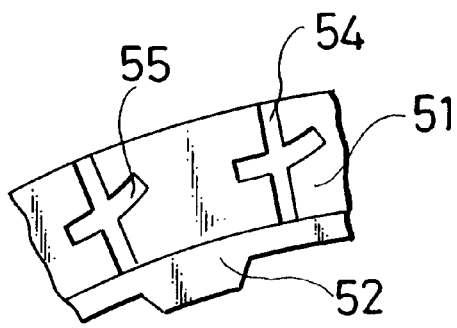
FIG. 5 is an enlarged fragmentary front view of a friction plate in a still further modification of the first embodiment.

Each non-communicating groove 55 shown in FIG. 5 is formed such that only one (the right-hand groove in FIG. 5) of grooves extending out from the communicating groove 54 on opposite sides of the communicating groove 54, respectively, has an inclination relative to a circumferential direction, in other words, has an end portion extending toward an outer circumferential edge of the friction plate 50, thereby making it possible to form an oil film in a different state depending on the rotating direction. In this modification, each non-communicating groove 55 is also closed at opposite ends thereof.

(Second Embodiment)

Figure 6:
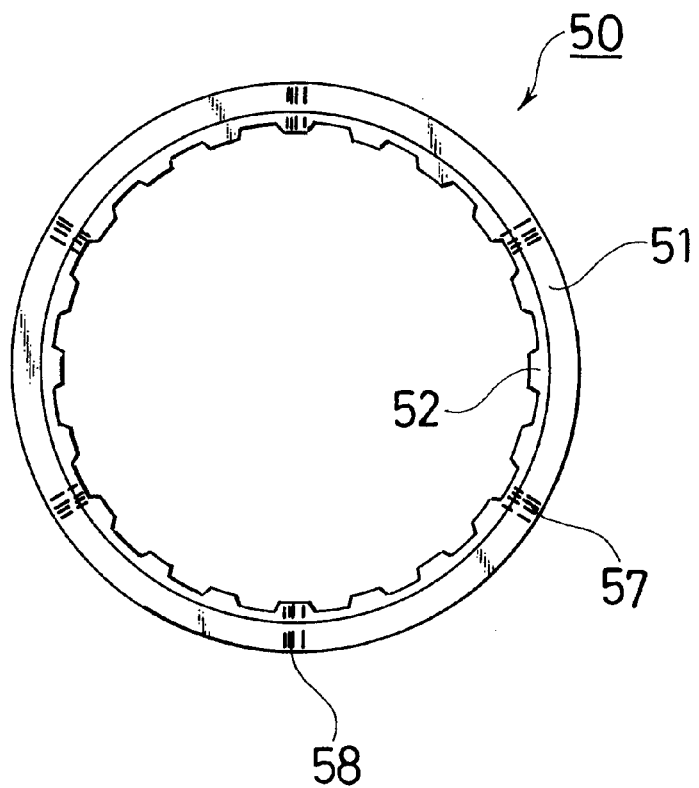
FIG. 6 is a front view of a friction plate in a multiplate lockup clutch according to a second embodiment of the present invention.
Figure 7:
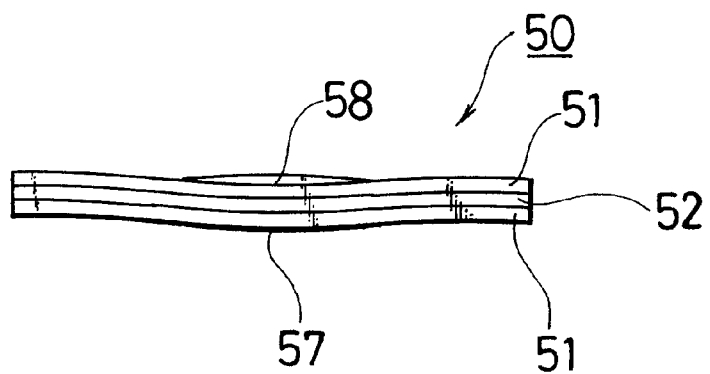
FIG. 7 is an enlarged fragmentary side view of the friction plate shown in FIG. 6.

With reference to FIGS. 6 and 7, a description will be made of each friction plate 50 in the multiplate lockup clutch according to the second embodiment. No grooves are formed on a friction surface of the friction plate 50. The friction plate 50 is shaped in a waveform with crest portions 57 and trough portions 58 repetitively arranged at predetermined intervals in a circumferential direction. The formation of such irregularity in shape makes it possible to form oil films in the trough portions, respectively. Further, each friction plate 50 is kept in contact only at the crest portions 57 with its associated counterpart while the piston 21 is out of operation. The resulting reduction in contact area makes it possible to further reduce drag torque which is produced as a result of an engagement of the multiplate lockup clutch under an internal pressure of a torque converter. It is to be noted that in FIG. 7, the crest portion 57 and the trough portion 58 are exaggerated to make the irregularity (i.e., wave) visible with ease. When the multiplate lockup clutch is brought into normal frictional engagement as a result of an operation of the piston 21, each friction plate 50 is flexed into a planar form so that the friction plate 50 is brought over the entire friction surface thereof into contact with its counterpart.

Figure 10:
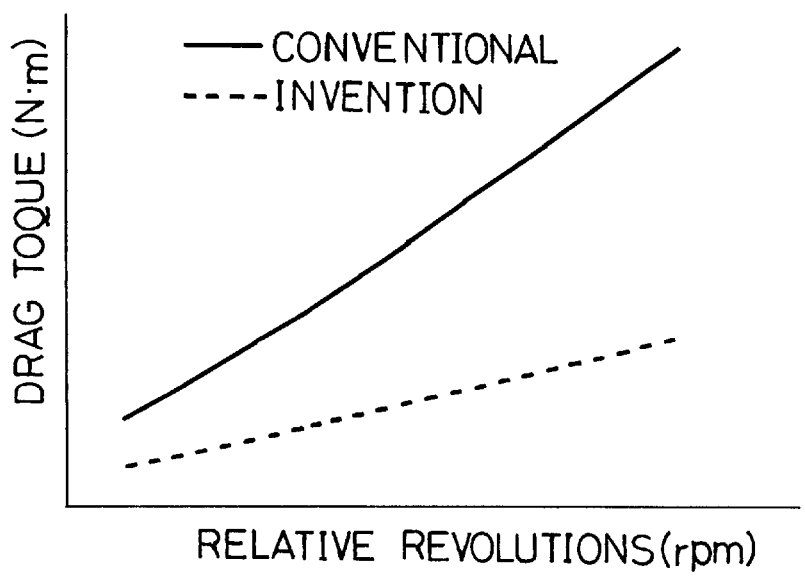
FIG. 10 is a graph showing the results of a comparison in drag torque between the torque converter shown in FIG. 8, in which the conventional multiplate lockup clutch provided with a plurality of such friction plates as that illustrated in FIG. 9 is incorporated, and a similar torque converter in which a multiplate lockup clutch according to the present invention provided with a like plural number of such friction plates as that depicted in FIG. 1 is incorporated.

Referring next to FIG. 10, the conventional torque converter will be compared in drag torque with the torque converter in which the multiplate lockup clutch according to the present invention provided with such friction plates as that depicted in FIG. 1 is incorporated. In the graph, drag torque (N·m) is plotted along the ordinate while relative revolutions (rpm) are plotted along the abscissa. The dotted line represents values of drag torque produced in the torque converter with the multiplate lockup clutch according to the presented invention incorporated therein, while the solid line represents values of drag torque produced in the conventional torque converter.

Each of these values was obtained in a state that an internal pressure had been produced by fluid (ATF or the like) inside the corresponding torque converter. As is clearly envisaged from the graph, the drag torque in the torque converter according to the present invention is lower than that in the conventional torque converter, and their difference becomes greater as the relative rotation increases.

It is to be noted that the present invention should be limited neither to the specific non-communicating grooves and the waveform nor to their shapes, numbers, pitches, arrangement patters and the like, all of which were described above described as the embodiments and modifications. In addition, their shapes, numbers, pitches, arrangement patters and the like are not absolutely required to be evenly formed or distributed but from the standpoint of reducing the above-mentioned judder, it may be more suitable to form or arrange them in a positively uneven manner. However, the present invention has been described above by taking only those formed or arranged evenly as examples because infinite variations are available in connection with the shapes, numbers, pitches, arrangement patters and the like of such non-communicating grooves and waveform.

Further, it is also possible to combine features of the friction plates in the multiplate lockup clutch according to the first embodiment with those of the friction plates in the multiplate lockup clutch according to the second embodiment. Described specifically, the respective non-communicating grooves in the first embodiment can be arranged between the individual trough portions or crest portions in the second embodiment. In this case, judder can be prevented more effectively. Described specifically, the non-communicating grooves on each friction plate assure the formation of a necessary oil film even when the multiplate lockup clutch is brought into normal frictional engagement as a result of an operation of the piston 21 and the friction plate is flexed into a planar form and is hence brought over the entire friction surface thereof into contact with its counterpart.

The present invention can also bring about similar advantageous effects even when friction lining segments are used. Described specifically, communicating grooves can be formed by forming the above-mentioned non-communicating grooves as unit friction lining segments and arranging the unit friction lining segments with appropriate spacing left between the adjacent unit friction lining segments. As an alternative, it is also possible to form only the non-communicating grooves by embossing or cutting. Manufacture of multiplate lockup clutches by the use of such friction lining segments can bring about a still further advantageous effect in that the yield per unit quantity of a friction lining material is improved.

This application claims the priority of Japanese Patent Application 2000-086245 filed Mar. 27, 2000 and the priority of Japanese Patent Application 2000-309070 filed Oct. 10, 2000, both of which are incorporated herein by reference.

What is claimed is:

1. A multiplate lockup clutch for use in fluid, said multiplate lockup clutch being provided with a muliplicity of friction plates, wherein each of said friction plates is provided on a friction surface thereof with a plurality of combined grooves; and each of said combined grooves comprises a first groove, which extends from an inner circumferential edge to an outer circumferential edge of said friction plate and communicates an inner circumference and an outer circumference of said friction plate with each other, and a second groove which intersects said first groove, extends in a circumferential direction of said friction plate, and is closed at opposite ends thereof such that said second groove does not extend to an adjacent combined groove when each of said friction plates is provided with only two combined grooves or to any one of adjacent combined grooves when each of said friction plates is provided with at least three combined grooves.

2. A multiplate lockup clutch according to claim 1, wherein said plurality of combined grooves are repetitively formed at predetermined intervals in said circumferential direction of said friction plate.

3. A multiplate lockup clutch according to claim 1, wherein said second groove is in the form of a pair of semicircles extending in opposite circumferential directions from said first groove.

4. A multiplate lockup clutch according to claim 1, wherein said second groove is substantially rectangular in shape, being relatively broad in the radial direction and relatively short in the circumferential direction.

5. A multiplate lockup clutch according to claim 1, wherein said second groove is in the form of a pair of arms extending in opposite circumferential directions from said first groove and inclined toward the outer circumferential edge of the friction plate.

6. A multiplate lockup clutch according to claim 1, wherein said second groove is in the form of a pair of arms extending in opposite circumferential directions from said first groove, one of said arms being inclined toward the outer circumferential edge of the friction plate.

7. A torque converter, with a multiplate lockup clutch incorporated therein, said multiplate lockup clutch being provided with a multiplicity of friction plates, wherein each of said friction plates is provided on a friction surface thereof with a plurality of combined grooves; and each of said combined grooves comprises a first groove, which extends from an inner circumferential edge to an outer circumferential edge of said friction plate and communicates an inner circumference and an outer circumference of said friction plate with each other, and a second groove which intersects said first groove, extends in a circumferential direction of said friction plate, and is closed at opposite ends thereof such that said second groove does not extend to an adjacent combined groove when each of said friction plates is provided with only two combined grooves or to any one of adjacent combined grooves when each of said friction plates is provided with at least three combined grooves.

8. A torque converter according to claim 7, wherein said plurality of combined grooves are repetitively formed at predetermined intervals in said circumferential direction of said friction plate.

* * * * *